United States Patent [19]

Rieden et al.

[11] Patent Number: 5,492,260
[45] Date of Patent: Feb. 20, 1996

[54] GARMENT SUPPORT ASSEMBLY

[75] Inventors: David D. Rieden, Lake Orin; Joseph A. Polizzi, Mt. Clemons; Kurt M. Mitschke, Sterling Heights, all of Mich.

[73] Assignee: General Motors Corporation, Detroit, Mich.

[21] Appl. No.: 292,702

[22] Filed: Aug. 19, 1994

[51] Int. Cl.⁶ ............................................ B60R 7/10
[52] U.S. Cl. .................... 224/553; 224/313; 224/557; 224/564; 224/927
[58] Field of Search .................... 224/42.45 R, 42.45 A, 224/42.46 R, 42.46 A, 313, 282, 0.5, 281, 275, 553, 557, 564, 927; 248/294, 301, 303, 304, 339, 291, 293, 309.1, 310, 315; 296/37.6, 37.7; 220/212.5, DIG. 28, 757, 759, 760, 761, 763, 765, 769, 776; 414/744.2

[56] References Cited

U.S. PATENT DOCUMENTS

| | | | |
|---|---|---|---|
| 1,200,736 | 10/1916 | Laganke . | |
| 1,461,938 | 7/1923 | Rose . | |
| 1,506,694 | 8/1924 | Toffey | 16/126 |
| 2,077,629 | 4/1937 | Lahr | 248/294 |
| 2,301,730 | 11/1942 | Mann | 224/281 |
| 2,602,622 | 7/1952 | Smith | 248/293 |
| 3,191,215 | 6/1965 | Watt | 16/126 |
| 3,385,547 | 5/1968 | West | 248/205 |
| 4,101,107 | 7/1978 | Antoszewski | 248/218.4 |
| 4,221,354 | 9/1980 | Kempkers | 248/293 |
| 4,297,962 | 11/1981 | Johnson | 114/218 |
| 4,444,344 | 4/1984 | Marcus et al. | 224/313 |
| 4,720,028 | 1/1988 | Takemura et al. | 224/42.45 A |
| 4,936,491 | 6/1990 | Calad et al. | 224/42.46 A |
| 5,226,659 | 7/1993 | Watjer et al. | 224/313 |

*Primary Examiner*—Linda J. Sholl
*Attorney, Agent, or Firm*—Kathryn A. Marra

[57] ABSTRACT

A garment support assembly includes a base element mounted on a vehicle wall. The base element has a transversely extending groove which is located adjacent the vehicle wall. The garment support assembly also includes a single continuous ring element. The ring element includes an inverted U-shaped hanger receiving portion closed by a transversely extending rod portion. The rod portion is slip-fittedly seated in the groove on the base element and is captured between the base element and the vehicle wall, thus pivotally connecting the ring element to the base element. This pivotal connection allows the ring element to move between a stored position in which the ring element is located in the same transversely extending vertical plane as the base element and an open position in which the hanger receiving portion projects into the interior space of the vehicle for receiving hangers thereon.

13 Claims, 2 Drawing Sheets

2

GARMENT SUPPORT ASSEMBLY

The present invention relates to vehicle accessories, and more particularly, to a garment support assembly for holding garment hangers and garments in a vehicle.

BACKGROUND OF THE INVENTION

Typically, vehicles are provided with relatively small hooks fixed to opposite sides of the headliner of the vehicle behind a front seat for receiving garment hangers such that clothes can be conveniently carried on a hanger in a hanging position. Such hooks are relatively small and can accommodate only a few wire hangers. In addition, these hooks are relatively unsightly since they remain in a fixed position projecting into the vehicle interior.

Retractable hooks are also known that present a more flush appearance when in a closed or retracted position while projecting a relatively large useful hook in the open extended position. While some of these hooks are sized for holding more hangers, they are still relatively unsightly to the vehicle occupants. To improve the visual appearance of the vehicle interior, other retractable hooks are stored out of sight in recessed areas in the vehicle wall. Modification to the vehicle wall increases assembly and manufacturing costs of the vehicle. These retractable hook arrangements also typically require several parts in addition to the hook, such as a base or support, fasteners, springs or biasing means, and pivot pins.

SUMMARY

The present invention provides an aesthetically pleasing garment support assembly that can hold numerous hangers. This attractive garment support assembly minimizes the number of components and is simple to assemble. Since the garment support assembly of the present invention is visually attractive, the need for structural modification to provide a recess in the vehicle wall to hide the garment support assembly is eliminated.

In accordance with the present invention, the garment support assembly includes a base element mounted on a vehicle wall. The base element has a transversely extending groove which is located adjacent the vehicle wall. The garment support assembly also includes a single continuous ring element. The ring element includes an inverted U-shaped hanger receiving portion closed by a transversely extending rod portion. The rod portion is slip-fittedly seated in the groove on the base element and is captured between the base element and the vehicle wall, thus pivotally connecting the ring element to the base element. This pivotal connection allows the ring element to move between a stored position in which the ring element is located in the same transversely extending vertical plane as the base element and an open position in which the hanger receiving portion projects into the interior space of the vehicle for receiving hangers thereon.

Since the rod portion of the ring element is slip-fittedly inserted into the groove on the base element, assembly of these two main components of the garment support assembly is easily accomplished without the use of tools or fasteners. Since the ring element in the stored position is located in the same transversely extending vertical plane as the base element, the garment support assembly is flush against the vehicle wall in the stored position and is visually pleasing to a vehicle occupant. Furthermore, the inverted U-shaped hanger receiving portion of the ring element can hold significantly more hangers in comparison to the relatively small fixed hooks typically found in vehicles.

Thus, the garment support assembly of the present invention is characterized by minimization of components, ease of assembly, and pleasing aesthetics, all accomplished while increasing the hanger receiving capacity of the garment support assembly.

BRIEF DESCRIPTION OF THE DRAWINGS

These and other features, objects and advantages of the present invention will become apparent upon consideration of the following description, appended claims, and accompanying drawings in which:

DESCRIPTION OF THE PREFERRED EMBODIMENT

Figure 1:
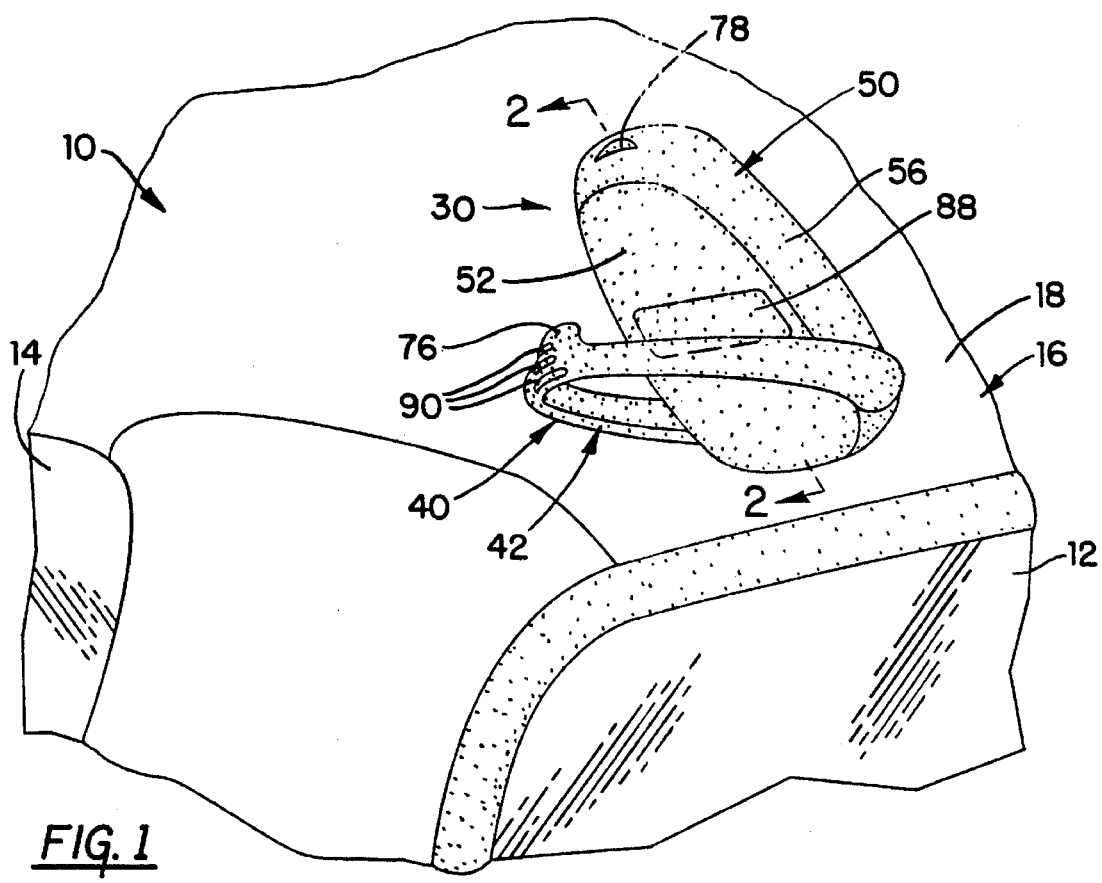
FIG. 1 is a perspective view of a partially-broken-away vehicle interior having a garment support assembly of the present invention including a continuous ring element shown in an open position.
Figure 2:
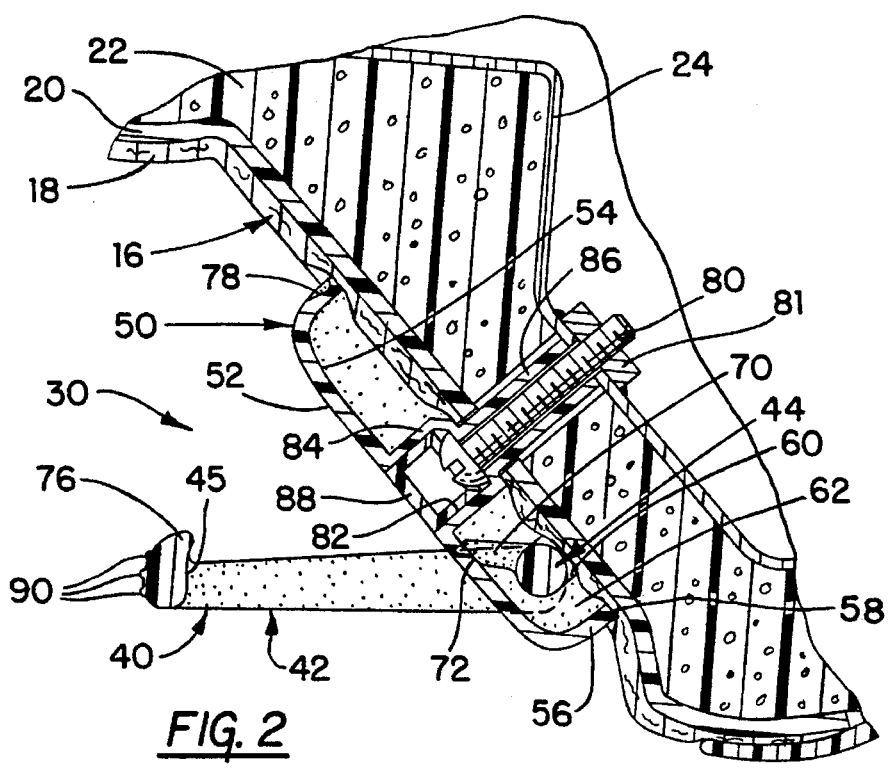
FIG. 2 is a sectional view taken along line 2—2 of FIG. 1 and showing the garment support assembly mounted on a vehicle wall and including the ring element shown in the open position.
Figure 3:
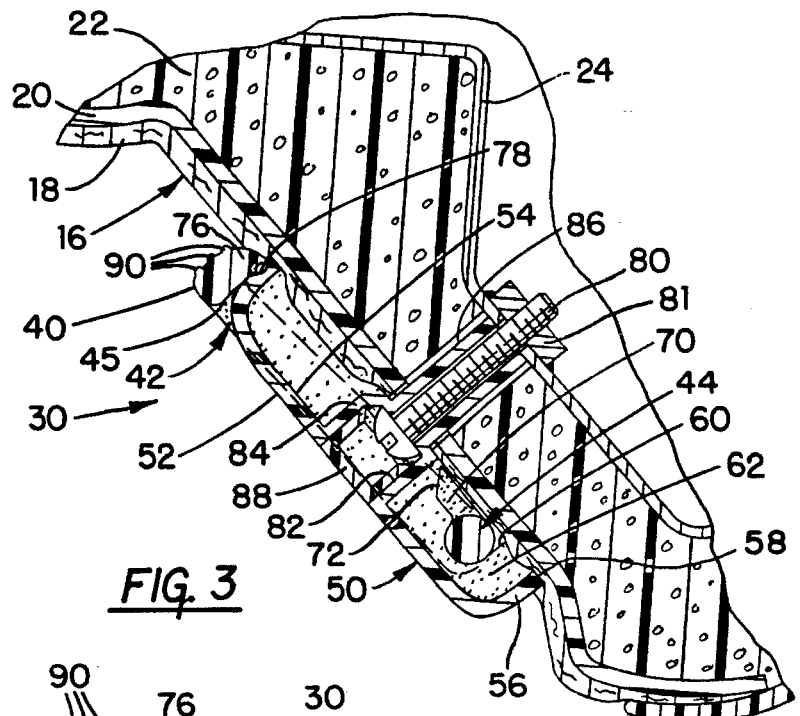
FIG. 3 is a view similar to FIG. 2, but including the ring element shown in the stored position.

Referring to FIG. 1, a vehicle interior 10 includes a side window 12, a rear window 14, and a vehicle wall 16 covered by a fabric headliner 18. Referring to FIGS. 2 and 3, construction of the vehicle wall 16 includes the headliner 18 supported on a substrate layer 20, and a foam layer 22 interposed between the substrate layer 20 and a vehicle rail structure 24 made of sheet metal. A garment support assembly 30 is rigidly mounted to the vehicle wall 16 and includes a single continuous ring element 40 for pivotal movement relative to a base element 50.

As best shown in FIG. 1, the base element 50 has a gradually upward inwardly tapering elliptical shape in a plan view and is preferably molded from a polymeric material. Referring to FIGS. 1–5, the base element 50 includes a smooth convex front side 52 facing the vehicle interior 10, and an opposite recessed rear side 54. The base element 50 further includes an outer perimeter being a rearwardly extending flange 56 having a rearmost edge 58 which engages the headliner 18. The flange 56 has a longitudinal depth which is significantly less than the vertical and transverse dimensions of the base element 50. Thus, the base element 50 is generally planar in a transversely extending vertical direction for flushly mounting against the vehicle wall 16.

Referring to FIGS. 2–5, the recessed rear side 54 of the base element 50 includes a transversely extending groove 62 adjacent the vehicle wall 16. The groove 62 further includes a pair of transversely opposed recessed notches 60 in the flange 56 adjacent the vehicle wall 16 and positioned near a lower end of the base element 50. The groove 62 provides an open space between the base element 50 and the vehicle wall 16 for receiving the ring element 40 therein, as will be described hereinafter.

Figure 4:
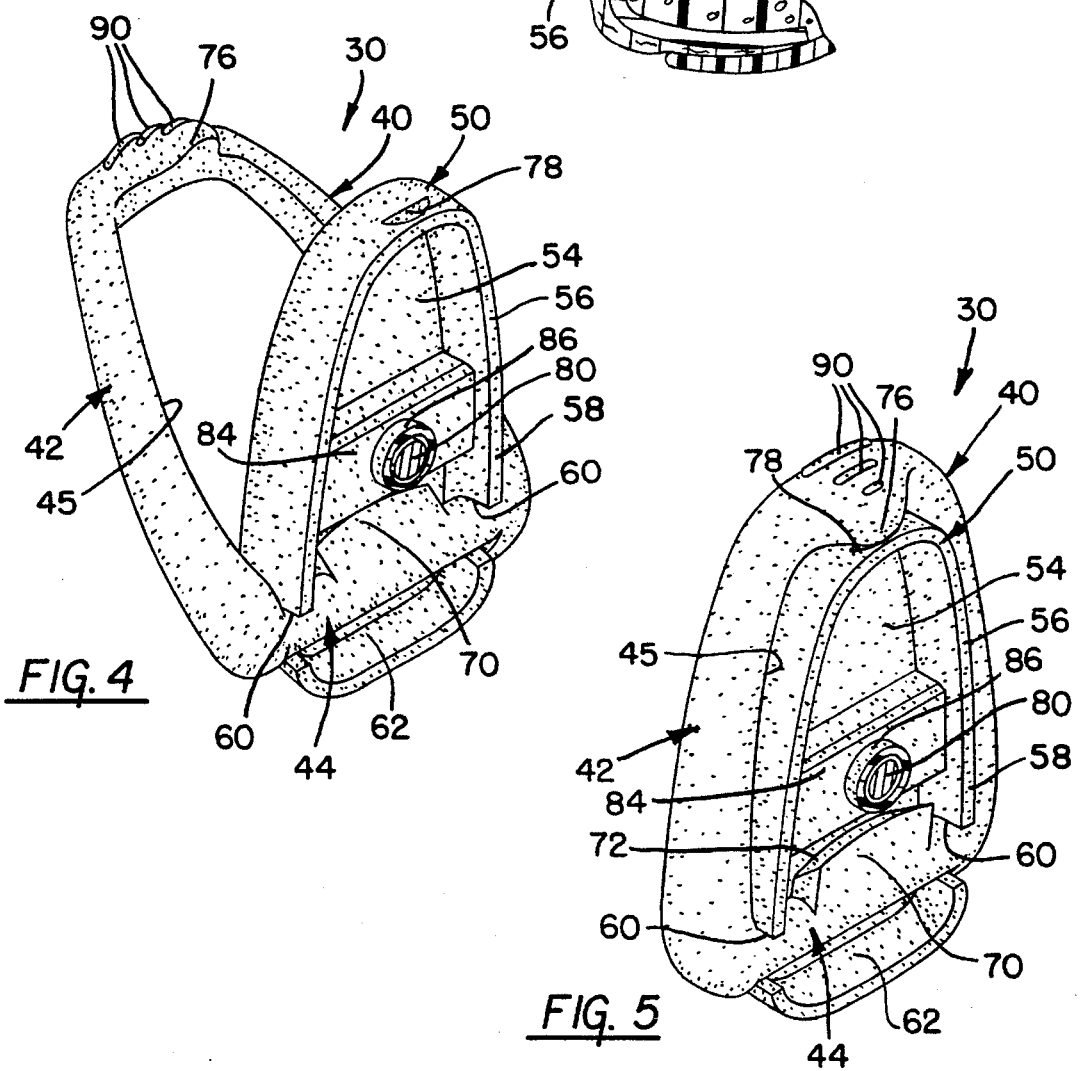
FIG. 4 is a rear perspective view of the garment support assembly broken-away from the vehicle wall and including the ring element shown in the open position.
Figure 5:
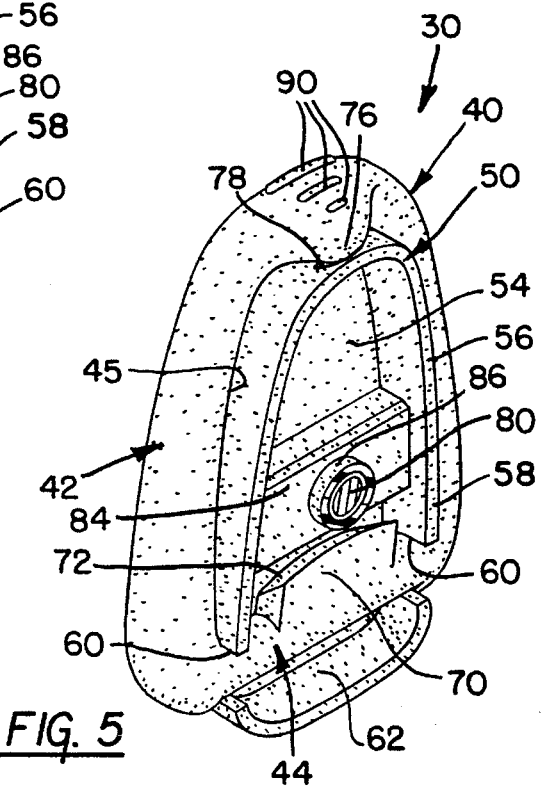
FIG. 5 is a view similar to FIG. 4, but including the ring element shown in the stored position.

A single continuous ring element 40 includes an integral, upper, inverted U-shaped hanger receiving portion 42 having a center opening 45 and closed by an integral transversely extending lower rod portion 44. The ring element 40 is preferably molded from a polymeric material. As best shown in FIGS. 4 and 5, the rod portion 44 is slip-fittedly seated in the groove 62 of the base element 50 and transversely extends between and engages the pair of notches 60 such that the rod portion 44 is captured in the groove 62 between the base element 50 and the vehicle wall 16 to pivotally connect the ring element 40 to the base element 50 and enable movement of the ring element 40 between a stored position, shown in FIGS. 3 and 5, and an open position, shown in FIGS. 1, 2 and 4.

In the stored position shown in FIGS. 3 and 5, the hanger receiving portion 42 of the ring element 40 is located in the same transversely extending vertical plane as the base element 50 and is substantially parallel to the base element 50 and the vehicle wall 16. Also in the stored position, the hanger receiving portion 42 partially surrounds the flange 56 of the base element 50 such that the base element 50 fills the center opening 45 of the hanger receiving portion 42. In addition, a cross-section of the ring element 40 is sized slightly smaller than the longitudinal depth of the flange 56. Thus, the entire garment support assembly 30 has a substantially flush, overall continuous elliptical shape which lies flush against the vehicle wall 16 for diminimus protrusion into the vehicle interior 10 when the ring element 40 is in the stored position.

In the open position shown in FIGS. 1, 2 and 4, the hanger receiving portion 42 of the ring element 40 projects into the vehicle interior 10 such that the central opening 45 is positioned for receiving hangers therethrough. Since the hanger receiving portion 42 has an inverted U-shape and partially surrounds the base element 50 in the stored position, the hanger receiving portion 42 may be relatively large and advantageously may hold numerous large plastic hangers. Also advantageously, garments, such as a coat, may be hung directly on the hanger receiving portion 42.

As best shown in FIGS. 2 and 4, the rod portion 44 of the ring element 40 includes an integral upwardly extending wedge portion 70 having a cam surface 72 for engaging the rear side 54 of the base element 50 when the ring element 40 is in the open, position to limit pivotal movement of the ring element 40 away from the stored position and to hold the ring element 40 in position to support the garment hangers and garments. Preferably, the wedge portion 70 is centrally located on the rod portion, and the cam surface 72 engages the base element 50 when the ring element 40 is rotated approximately 45 degrees downwardly away from the stored position such that the ring element 40 is nearly parallel with respect to ground so that hangers may easily be placed on the hanger receiving portion 42.

Referring to FIG. 3, the hanger receiving portion 42 of the ring element 40 also includes a first integral latching portion 76 being a protrusion 76 which extends rearwardly relative the stored position of the ring element 40. The protrusion 76 is centrally located on the top of the hanger receiving portion 42 of the ring element 40. A second latching portion 78 being a complementary-shaped integral indentation 78 is centrally located on the uppermost flange 56 of the base element 50. As best shown in FIG. 3, when the ring element 40 is in the stored position, the protrusion 76 and indentation 78 are matably aligned for releasable interference-fitted connection, thus maintaining the ring element 40 in the stored position. The ring element 40 and base element 50, both preferably made of a polymeric material, are sufficiently resilient to easily enable manual release of the interference-fitted connection between the first and second latching portions 76, 78 by the vehicle occupant.

Advantageously in the open position as best shown in FIGS. 1 and 2, the protrusion 76 is nearly perpendicular relative to ground to serve the additional function of assisting in holding a garment, such as a coat, directly on the hanger receiving portion 42 of the ring element 40.

As best shown in FIGS. 2 and 3, a single elongated fastener 80, such as screw, extends through a centrally located aperture 82 in the base element 50 for rigidly mounting the entire garment support assembly 30 to the vehicle wall 16. The rear side 54 of the base element 50 preferably includes a transversely extending reinforcement rib 84, and an elongated rearwardly extending annular post 86 for positioning the fastener 80. The fastener 80 extends through the base element 50, headliner 18, substrate layer 20, foam layer 22 and sheet metal vehicle rail structure 24 and is securely anchored to the vehicle rail structure 24, for example, by a pre-welded nut 81. The base element 50 further includes a removable plug 88 molded into shape with the base element 50 for friction-fitted connection within the aperture 82 in the base element 50 to provide an aesthetically pleasing closure for the aperture 82.

The garment support assembly 30 is easily assembled as follows. The ring element 40 is placed behind the rear side 54 of the base element 50 and brought forwardly until the rod portion 44 is slip-fittedly seated in the groove 62. Thus, assembly of the two main components 40, 50 of the garment support assembly 30 is easily accomplished without the use of tools. Next, the fastener 80 is inserted in the aperture 82 of the base element 50 and secured to the pre-welded nut 81 on the vehicle rail structure 24. Thus, the rod portion 44 of the ring element 40 is captured between the base element 50 and the vehicle wall 16 for pivotal movement between the stored and open positions. Finally, the plug 88 is pushed into the aperture 82.

Referring to FIGS. 2–4, the garment support assembly 30 is operated as follows. Normally, the ring element 40 is maintained in the stored position by the interference-fitted connection of the first and second latching portions, the protrusion 76 and indentation 78 on the ring element 40 and base element 50, respectively. To release the protrusion 76 from the indentation 78, the vehicle occupant simply grasps the top of the ring element 40 and rotates it in a downwardly direction. Preferably, the topmost outer perimeter of the ring element 40 includes a plurality of centrally located and transversely extending raised segments 90 for the occupant to grip when releasing the latching portions 76, 78. Once these latching portions 76, 78 are released, gravity biases the ring element 40 towards the open position until the cam surface 72 of the ring element 40 engages the base element 50, thus limiting the pivotal movement of the ring element 40 away from the stored position. In the open position, numerous garment hangers or garments can be placed on the hanger receiving portion 42 of the ring element 40. To return the ring element 40 to the stored position, the occupant grasps the ring element 40 and rotates it upwardly until the protrusion 76 snaps into the indentation 78 to maintain the ring element 40 in the stored position.

A courtesy light (not shown) may be mounted to the base element 50 of the garment support assembly 30 to provide light to a rear seat occupant when the garment support assembly 30 is not in use.

It will be appreciated that the present invention minimizes the number of components, is simple to assemble, and eliminates the need for separate pivot pins, springs, or multiple fasteners. It will further be appreciated that the garment support assembly 30 of the present invention with the ring element 40 in the stored position creates an aesthetically pleasing overall continuous elliptical shape mounted flush against the vehicle wall 16, thus eliminating the need for a recess in the vehicle wall 16 to hide the garment support assembly 30. Advantageously, the garment support assembly 30 can be mounted to most existing vehicle walls by a single elongated fastener 80. Furthermore, the hanger receiving portion 42 of the ring element 40 advantageously is capable of supporting numerous large plastic hangers or directly supporting garments, while permitting an attractive garment support assembly 30 when not in use.

It will be understood that a person skilled in the art may make modifications to the specific embodiment shown herein within the scope and intent of the claims. For example, although the preferred embodiment utilizes latching portions being a protrusion 76 on the ring element 40 and an indentation 78 on the base element 50, other complementary-shaped latching portions may also be used. Although the base element 50 and ring element 40 are preferably molded from a polymeric material, these elements 40, 50 could be made of a wide variety of materials including metals so long as the material has sufficient resiliency for providing a releasable interference-fitted connection between the latching portions. Although the preferred embodiment utilizes a particular fastener 80, many other commercial elongated fasteners may be utilized to mount the base element 50 to the vehicle wall 16, such as an axially flexible push-in type fastener.

While the present invention has been described as carried out in a specific embodiment thereof, it is not intended to be limited thereby but is intended to cover the invention broadly within the scope and spirit of the appended claims.

The embodiments of the invention in which an exclusive property or privilege is claimed are defined as follows:

1. A garment support assembly for holding garment hangers in a vehicle having a vehicle wall and a vehicle interior, the garment support assembly comprising:

a base element adapted to be mounted on the vehicle wall, the base element having a transversely extending groove thereon adjacent the vehicle wall, and a single continuous ring element including an inverted U-shaped hanger receiving portion closed by a transversely extending rod portion, the rod portion slip-fittedly seated in the groove and captured between the base element and the vehicle wall to pivotally connect the ring element to the base element and enable movement of the ring element between a stored position in which the ring element is located in the same transversely extending vertical plane as the base element and an open position in which the hanger receiving portion projects into the vehicle interior for receiving hangers thereon, the ring element including a first latching portion and the base element including a second latching portion, said latching portions being matably aligned for a releasable interference-fitted connection when the ring element is in the stored position to maintain the ring element in the stored position.

2. The garment support assembly of claim 1 wherein the base element includes an outer perimeter being a rearwardly extending flange engaging the vehicle wall, the groove includes a pair of transversely opposed recessed notches in the flange adjacent the vehicle wall, and the rod portion transversely extends between and engages the notches.

3. The garment support assembly of claim 1 further characterized by the rod portion of the ring element including a cam surface for engaging the base element when the ring element is in the open position to limit pivotal movement of the ring element away from the stored position and hold the ring element in position to support the garment hangers.

4. The garment support assembly of claim 1 wherein one of said latching portions is an indentation and the other is a protrusion.

5. The garment support assembly of claim 4 wherein a topmost outer perimeter of the ring element includes at least one transversely extending raised segment for an occupant to grip when releasing the latching portions.

6. The garment support assembly of claim 1 wherein the base element has an elliptical shape and includes an outer perimeter being a rearwardly extending flange engaging the vehicle wall, and the hanger receiving portion being sized for partially surrounding the flange of the base element when the ring element is in the stored position whereby the base element fills the center of the hanger receiving portion of the ring element when the ring element is in the stored position such that the garment support assembly has an overall continuous elliptical shape when the ring element is in the stored position.

7. A garment support assembly for holding garment hangers in a vehicle having a vehicle wall and a vehicle interior, the garment support assembly comprising:

a base element adapted to be rigidly mounted on the vehicle wall, the base element having a convex front side facing the vehicle interior and an opposite recessed rear side, the recessed rear side including a transversely extending groove adjacent the vehicle wall, and the base element including an outer perimeter being a rearwardly extending flange adapted to engage the vehicle wall, and the groove including a pair of transversely opposed recessed notches in the flange adjacent the vehicle wall; and a single continuous ring element including an inverted U-shaped hanger receiving portion closed by a transversely extending rod portion, the rod portion transversely extending between and engaging the notches, the rod portion being captured in the groove between the base element and the vehicle wall to pivotally connect the ring element to the base element and enable movement of the ring element between a stored position in which the hanger receiving portion of the ring element is substantially parallel to the base element and vehicle wall and an open position in which the hanger receiving portion of the ring element projects into the vehicle interior for receiving the hangers thereon.

8. The garment support assembly of claim 7 further characterized by the rod portion of the ring element including a cam surface for engaging the base element when the ring element is in the open position to limit pivotal movement of the ring element away from the stored position and hold the ring element in position to support the garment hangers.

9. The garment support assembly of claim 7 wherein the ring element includes a first latching portion and the base element includes an second latching portion, said latching portions being matably aligned for releasable interference-fitted connection when the ring element is in the stored position to maintain the ring element in the stored position.

10. The garment support assembly of claim 9 wherein one of said latching portions is an indentation and the other is a protrusion.

11. The garment support assembly of claim 7 wherein a topmost outer perimeter of the ring element includes at least one transversely extending raised segment for an occupant to grip when releasing the latching portions.

12. The garment support assembly of claim 7 wherein the base element has an elliptical shape, and the hanger receiving portion partially surrounds the flange of the base element when the ring element is in the stored position such that the base element fills the center of the hanger receiving portion of the ring element when the ring element is in the stored position such that the garment support assembly has an overall continuous elliptical shape when the ring element is in the stored position.

13. A garment support assembly for holding garment hangers in a vehicle having a vehicle wall and a vehicle interior, the garment support assembly comprising:

a base element adapted to be mounted on the vehicle wall, the base element having a transversely extending groove thereon adjacent the vehicle wall;

a single continuous ring element including an inverted U-shaped hanger receiving portion closed by a transversely extending rod portion, the rod portion slip-fittedly seated in the groove and captured between the base element and the vehicle wall to pivotally connect the ring element to the base element and enable movement of the ring element between a stored position in which the ring element is located in the same transversely extending vertical plane as the base element and an open position in which the hanger receiving portion projects into the vehicle interior for receiving hangers thereon; and the rod portion of the ring element including a cam surface for engaging the base element when the ring element is in the open position to limit pivotal movement of the ring element away from the stored position and hold the ring element in position to support the garment hangers.

* * * * *